United States Patent [19]

Frank

[11] Patent Number: 4,625,823

[45] Date of Patent: Dec. 2, 1986

[54] CONTROL SYSTEM AND METHOD FOR A FLYWHEEL TYPE POWER DELIVERY SYSTEM

[75] Inventor: Andrew A. Frank, Madison, Wis.

[73] Assignee: Aisin Seiki Kabushiki Kaisha, Kariya, Japan

[21] Appl. No.: 651,166

[22] Filed: Sep. 17, 1984

[51] Int. Cl.[4] .............................................. B60K 9/04
[52] U.S. Cl. .................................... 180/165; 60/718; 74/847; 192/103 R
[58] Field of Search .................. 180/165; 74/847, 866, 74/877, 572 C; 192/103 R, 48.8, 48.9; 60/718

[56] References Cited

U.S. PATENT DOCUMENTS

| 3,672,244 | 6/1972 | Nasvytis | 74/859 |
| 4,126,200 | 11/1978 | Miller et al. | 180/165 |
| 4,131,171 | 12/1978 | Keyes | 180/54.1 |

OTHER PUBLICATIONS

"Feasibility Study of a CVT System for an Internal-Combustion Engine/Flywheel—Drive Vehicle", Y. Kemper, L. E. Elfes & E. G. Trachman, Vadetec Corporation.

Primary Examiner—John J. Love
Assistant Examiner—Richard M. Camby
Attorney, Agent, or Firm—Banner, Birch, McKie & Beckett

[57] ABSTRACT

An improved control system and method for controlling the operation of a flywheel type power delivery system, such as used in an automotive vehicle. A predetermined maximum vehicle speed limit dictates the operating speed range for the flywheel. Desirably, this speed range is as low as possible so as to minimize spin losses. Above a threshold vehicle speed of approximately 45 miles per hour, the flywheel is completely uncoupled from the system and vehicle propulsion is provided by direct coupling of the engine through the continuously variable ratio transmission (CVT) to the vehicle driving wheels.

20 Claims, 3 Drawing Figures

CONTROL SYSTEM AND METHOD FOR A FLYWHEEL TYPE POWER DELIVERY SYSTEM

BACKGROUND OF THE INVENTION

This invention relates to flywheel type power delivery systems, such as used in motor vehicles, and more particularly, to a control system and method for efficiently operating such a power delivery system.

Conventional automotive power plant systems—wherein an engine is directly coupled to a transmission and drive line—operate on the basis of an energy creation concept. That is, only the amount of shaft energy needed to propel the vehicle at any given instant is "created" by the engine. Inherent inefficiencies in this type of system arise from the fact that the engine is called upon to deliver this energy over a fairly wide operating range, only a small portion of which typically will afford production of energy at maximum efficiency.

In an effort to improve the overall efficiency of automotive propulsion systems, flywheel type vehicles have been developed. U.S. Pat. Nos. 3,672,244 and 4,131,171 disclose two examples of such systems. In flywheel systems, shaft energy is intermittently produced by the engine over a narrower and more efficient operating range, and excess energy not required for immediate propulsion is stored as kinetic energy in a rotating flywheel of substantial mass. This stored energy typically is tapped when needed for propulsion, and the engine is recoupled to the flywheel to further "charge" it with kinetic energy when the flywheel has substantially slowed. The flywheel can also be charged by regeneration from the vehicle during braking. Significant increases in system efficiency have been realized by utilizing this "energy management" concept.

Despite developments in flywheel type automotive vehicles, there still remains room for significant improvement in overall flywheel vehicle efficiency. Kemper, Elfes and Trachman of Vadetec Corporation recognized in an October, 1980 report prepared by Lawrence Livermore Laboratory entitled "Feasibility Study Of A CVT System For An Internal-Combustion Engine/Flywheel-Drive Vehicle" that there exists a potential for a 100% improvement in system efficiency. To date this has not been realized. This invention represents a significant step toward achieving that goal.

SUMMARY OF THE INVENTION

It is therefore an object of the present invention to provide a flywheel type power delivery system and control scheme therefor which maximizes the efficient "creation" and "management" of energy.

Another object of the invention is to provide such a system and control scheme which are well-suited for automotive applications.

These and other objects of the invention are accomplished by providing a method of controlling the operation of a flywheel type power delivery system having a flywheel, prime mover, and a continously variable ratio transmission (CVT) operatively coupled to the flywheel for delivering power to an output shaft. A desired maximum output shaft speed limit is predetermined, and a desired flywheel operating speed range is then determined as a function of the output shaft speed limit. The actual speed of the flywheel is measured, and the delivery of power from the prime mover to the flywheel is controlled as a function of measured flywheel speed to keep the speed of the flywheel within the predetermined range.

The invention also encompasses apparatus for carrying out the prescribed method, and the application of these principles to controlling a motor vehicle.

BRIEF DESCRIPTION OF THE DRAWINGS

The novel features of the invention are set forth with particularity in the appended claims, but the invention will be understood more fully and clearly from the following detailed description of the invention as set forth in the accompanying drawings, in which:

DETAILED DESCRIPTION

In the description that follows, the principles of the invention are described as applied to a motor vehicle. It is to be understood, however, that these principles are equally applicable to any type of power delivery system utilizing a prime mover, flywheel and CVT.

Figure 1:
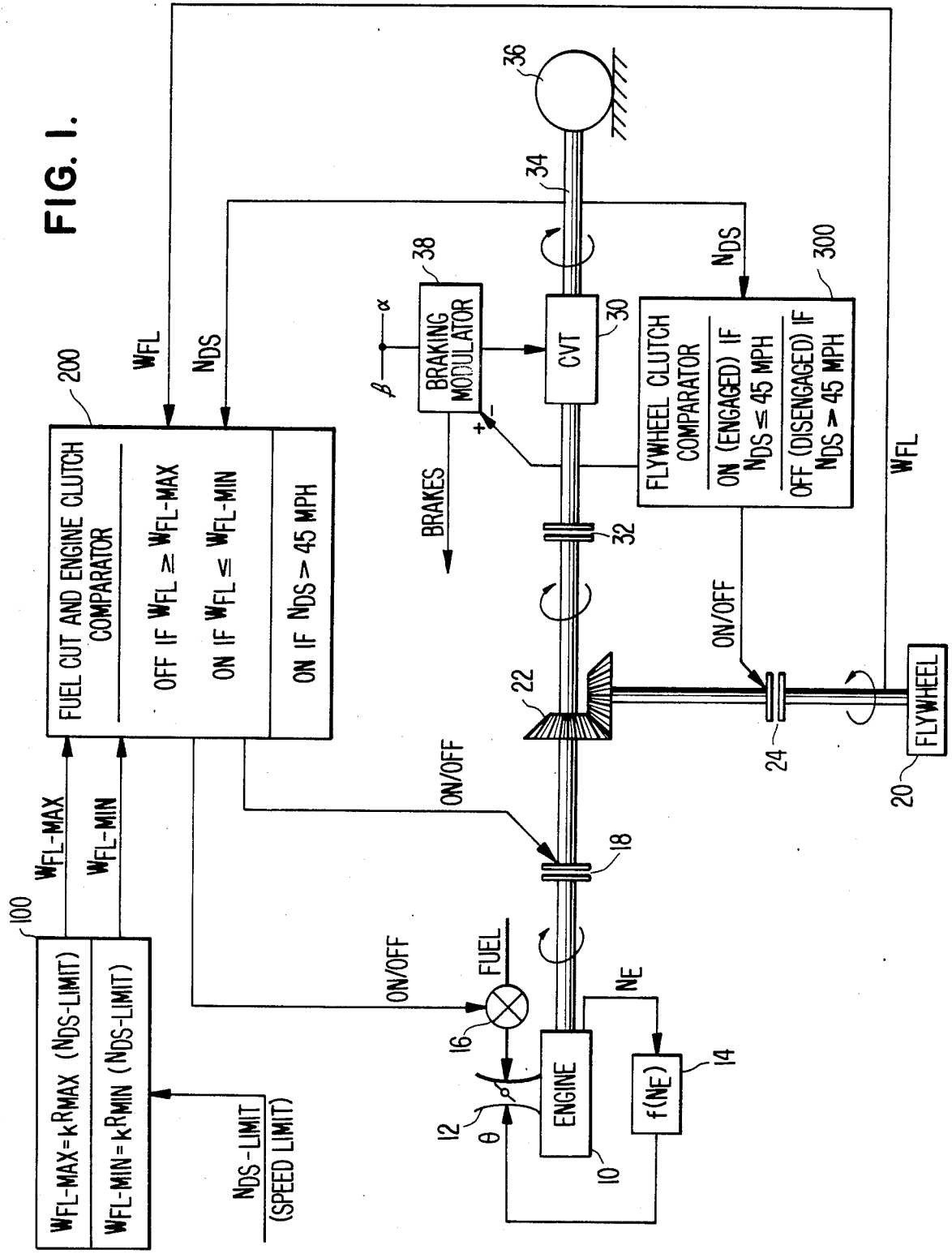
FIG. 1 is a schematic representation of an engine/flywheel/CVT vehicle propulsion system, and the control system therefor according to the invention.

Referring to FIG. 1, the basic components of a vehicular propulsion system are illustrated as an engine 10, a flywheel 20 and a continuously variable ratio transmission (CVT) 30. Engine 10 typically is an internal combustion engine of any type having a fuel delivery mechanism 12 controlled by a function generator 14 in accordance with the measured speed of the engine $N_E$. This control scheme is described in my U.S. Pat. No. 4,459,878 (incorporated herein by reference), and yields highly efficient engine operation. $\theta$ is representative of the metered fuel quantity and, in the case of a gasoline engine, throttle position. Fuel is delivered to a fuel delivery mechanism 12 through a valve 16 which is operated in accordance with the inventive control scheme as described below.

Power is delivered from engine 10 to flywheel 20 via a clutch 18, which may be of the dry pressure plate type, a fluid coupling or the like. Flywheel 20 is driven through bevel gearing 22 and a flywheel clutch or coupling 24 whose operation is controlled as described below. Flywheel energy is delivered to CVT 30 via a vehicle stop clutch 32, and then via drive shaft 34 to two or more driving wheels 36 of the vehicle. In accordance with the control scheme disclosed in the aforementioned U.S. Pat. No. 4,459,878, accelerator pedal position $\alpha$ directly controls CVT ratio such that engine operation is completely independent of any manual inputs by the operator of the vehicle. CVT 30 may be any type of transmission wherein transmission ratio varies substantially continuously over a range of ratios. The variable sheave diameter V-belt drive type of CVT described in my earlier U.S. Pat. No. 4,459,878 is a typical example of a suitable CVT.

It should be noted that in this or any other type of flywheel vehicle, the driving wheels preferably are the front wheels of the vehicle, or all of the wheels of the vehicle. This front wheel drive or four wheel drive configuration is important from a vehicle controllability and safety standpoint when one considers the effect of excessive dynamic braking by a propulsion system having the high degree of inertia of a rotating flywheel. Thus, if the vehicle simply were a rear wheel drive vehicle, excessive dynamic braking likely would cause rear wheel skidding and loss of directional stability of the vehicle in the absence of any sophisticated control system for moderating the dynamic braking effect. Such a system might include a braking modulator 38 responsive to movements of the accelerator pedel α and brake pedal β for applying a small amount of mechanical braking to the front wheels at first, in combination with limited dynamic braking to the rear, progressively increasing to full mechanical braking.

The concepts embodied in the present invention are based on the recognition that flywheel spin losses significantly detract from overall system efficiency. Such losses are proportional to the square of flywheel rotational speed. Thus, the objective is to maintain the speed of the flywheel at a minimum consistent with the ability of the flywheel to store and deliver needed kinetic energy for vehicle propulsion. The energy needs for vehicle propulsion will vary dependening on the maximum desired vehicle speed (i.e., vehicle speed limit). The present invention recognizes, therefore, that for optimum efficiency the flywheel operating speed range should vary as a function of the vehicle speed limit. Ideally, each predetermined speed range should be as low as possible, as explained above, so as to minimize the flywheel and other system spin losses. This is accomplished by defining maximum and minimum flywheel operating speeds as follows:

$$\omega_{FL\text{-}MAX} = k\, R_{MAX}\, (N_{DS\text{-}LIMIT})$$

$$\omega_{FL\text{-}MIN} = k\, R_{MIN}\, (N_{DS\text{-}LIMIT})$$

where,
- $\omega_{FL\text{-}MAX}$ = maximum flywheel operating speed
- $\omega_{FL\text{-}MIN}$ = minimum flywheel operating speed
- $k$ = a constant
- $R_{MAX}$ = maximum transmission ratio
- $R_{MIN}$ = minimum transmission ratio
- $N_{DS\text{-}LIMIT}$ = maximum drive shaft rotational speed corresponding to a desired vehicle speed limit.

As previously discussed, the flywheel can also be charged by regeneration from the vehicle during braking. In accordance with the invention, if the flywheel speed is maintained at a minimum, its capacity to charge during the braking cycle will be increased, thereby permitting maximum recovery of energy from the vehicle.

Referring again to FIG. 1, the above described principles now will be explained as applied to the control system of the invention. The initial controlling input to the system, $N_{DS\text{-}LIMIT}$ (i.e., vehicle speed limit), is applied to function generator 100, which defines the flywheel operating speed range in terms of maximum and minimum flywheel speeds $\omega_{FL\text{-}MAX}$ and $\omega_{FL\text{-}MIN}$, respectively, in accordance with the dialed-in speed limit. Actual measured flywheel speed $\omega_{FL}$ is compared to these maximum and minimum limits in a fuel cut and engine clutch comparator 200. If the actual measured flywheel speed is equal to or below the lower end of the range, fuel valve 16 is opened and clutch 18 is engaged, whereby engine 10 is turned on and is coupled to flywheel 20 to deliver power thereto. Accordingly, flywheel 20 is charged with energy to bring its speed back up to within the prescribed operating range. Once actual flywheel speed $\omega_{FL}$ equals or exceeds the upper end of the operating range, fuel valve 16 is closed and clutch 18 is disengaged, thereby effectively shutting down the engine and disengaging it from the flywheel. In this mode, energy for vehicle propulsion is extracted from the flywheel.

Figure 3:
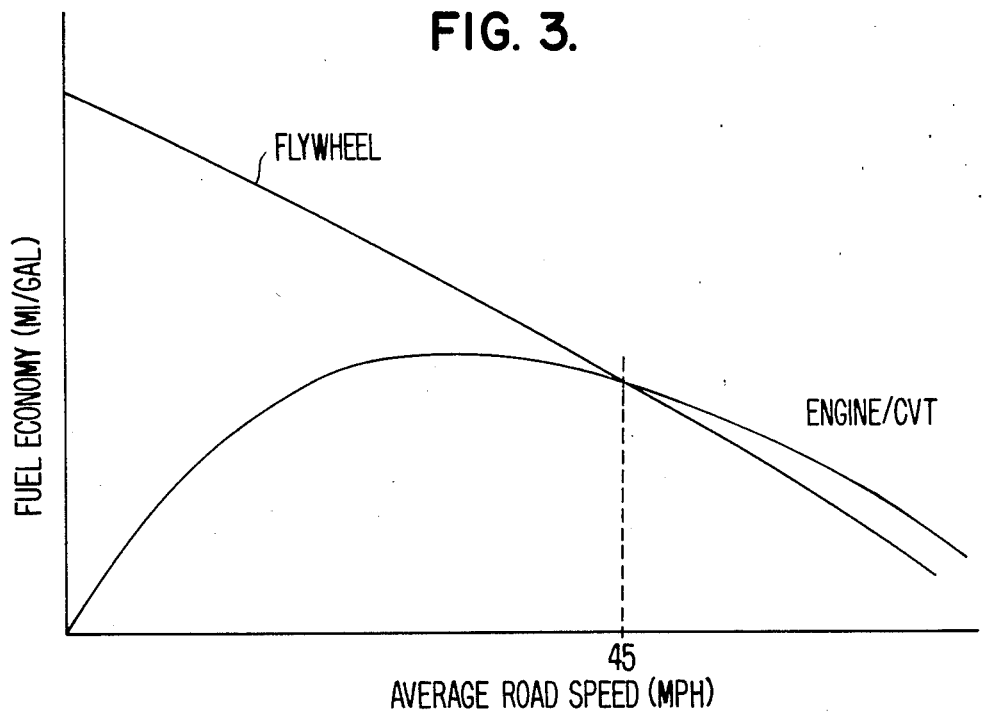
FIG. 3 is a graph of vehicle fuel economy as a function of average vehicle speed for two different types of vehicle propulsion systems.

Referring to FIG. 3, vehicle fuel economy there is plotted as a function of average vehicle road speed for flywheel and non-flywheel CVT power plants. This figure reveals the significant gain in efficiency by the use of a flywheel energy storage device at lower vehicle speeds. However, as vehicle speed approaches approximately 45 miles per hour, this efficiency advantage of a flywheel system is all but effectively lost. Accordingly, it is advantageous for vehicle speeds in excess of approximately 45 miles per hour to switch over from flywheel operation to direct engine-CVT propulsion without the use of a flywheel. This switchover speed is dependent upon the vehicle and type of driving and, in fact, may range from 20 mph to 50 mph.

Referring again to FIG. 1, this switchover is accomplished by means of a flywheel clutch comparator 300, which compares measured drive shaft speed (which of course is proportional to vehicle speed) to the threshold value of 45 miles per hour. If measured drive shaft speed $N_{DS}$ is equal to or less than 45 miles per hour, flywheel clutch 24 remains engaged. Furthermore, fuel cut and engine clutch comparator 200 will control engine clutch 18 and fuel valve 16 in accordance with function generator 100. If measured drive shaft speed exceeds an equivalent vehicle speed of 45 miles per hour, flywheel clutch comparator 300 disengages flywheel clutch 24, and fuel cut and engine clutch comparator 200 maintains fuel valve 16 open and engine clutch 18 engaged, so that the flywheel 20 is effectively isolated from the system and power is delivered directly from the engine through the CVT to the driving wheels.

Flywheel clutch comparator 300 also effects inversion of the acceleration and braking signals α, β at the switchover point through braking modulator 38. This is required because, to effect similar vehicle acceleration, ratio changes in a flywheel system are the inverse of ratio changes in a non-flywheel system. This phenomenon is due to the inherent physical differences between the systems: a flywheel "appears" to a CVT as a constant speed energy source, whereas an engine "appears" as a variable speed energy source. Thus, one must reduce transmission ratio to accelerate a vehicle equipped with a flywheel system, whereas one must increase transmission ratio to accelerate a vehicle equipped with an engine/CVT (non-flywheel) system.

Figure 2:
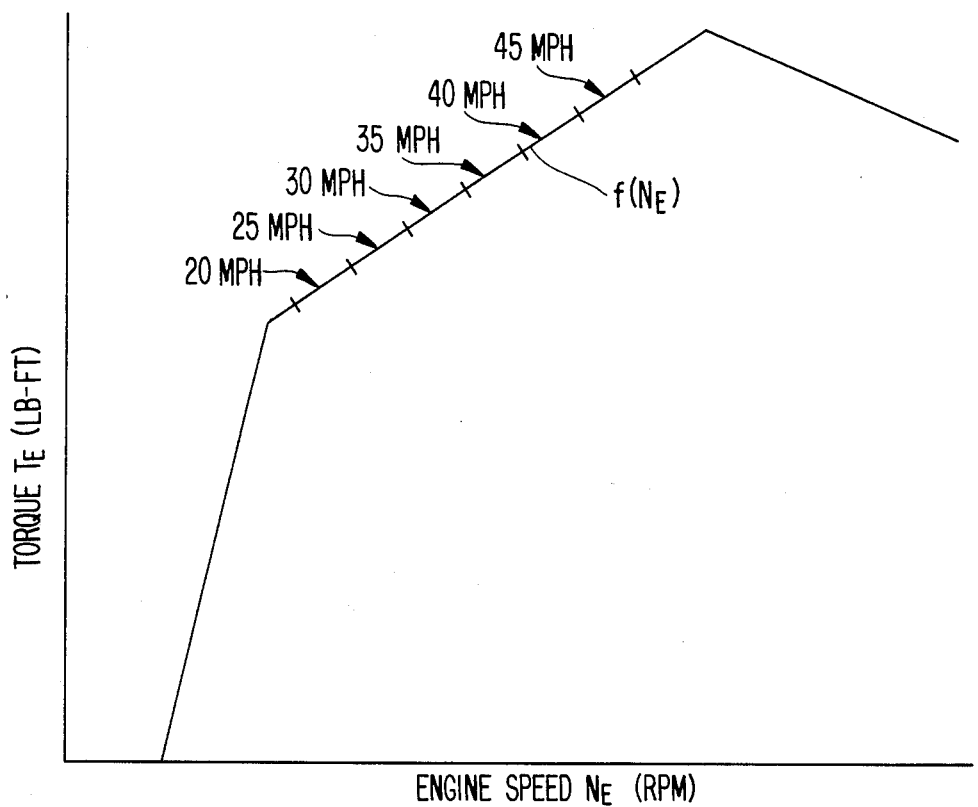
FIG. 2 is a plot of engine output torque as a function of engine speed.

FIG. 2 depicts an ideal engine operating line (for example, for minimum fuel consumption) as a plot of engine output torque $T_E$ as a function of engine speed $N_E$. A more detailed description of such a plot is contained in my U.S. Pat. No. 4,459,878. The various "dialed in" vehicle speed limits delineate various portions of this ideal operating line, such that engine operation for any given speed limit occurs along only a small portion of this line. Accordingly, the efficiency of energy production by the engine is maximized.

The above described control scheme quite simply and effectively accomplishes its primary objective of minimizing flywheel spin losses and maximizing overall system efficiency. The specific parameter values set forth in the preferred embodiment described above are in no way intended to limit the scope of the invention, it being apparent that these parameters will vary in accordance with engine, transmission and vehicle design, and desired behavior and performance. While an electronic control system has been schematically illustrated in the preferred embodiment, it is to be understood that any type of control system which functions in a similar manner may be used. It would appear that a control system incorporating many mechanical components would perhaps be the most reliable and least expensive alternative. Numerous other modifications of the invention will be apparent to those skilled in the art without departing from the true scope of the invention which is defined by the appended claims.

I claim:

1. In a method of controlling the operation of a flywheel type power delivery system having an energy-storing flywheel, a prime mover operatively coupled to the flywheel for delivering power to the flywheel, and a continuously variable ratio transmission operatively coupled to the flywheel for delivering power to an output shaft, the improvement comprising the steps of:

variably selecting a desired maximum output shaft speed limit;

predetermining a desired flywheel operating speed range defined by a minimum flywheel speed and a maximum flywheel speed, each of said minimum and maximum flywheel speeds being defined as a function of the variably selected desired maximum output shaft speed limit;

measruing the actual speed of the flywheel; and controlling the delivery of power from the prime mover to the flywheel as a function of measured flywheel speed to keep the speed of the flywheel within said predetermined range.

2. A method according to claim 1 wherein said desired flywheel operating speed range is substantially the minimum speed range required to maintain output shaft speed at said speed limit throughout the transmission ratio range.

3. A method according to claim 2 wherein the step of controlling power delivery comprises diminishing the power delivered to the flywheel when flywheel speed equals or exceeds the maximum speed of its range, and increasing the power delivery to the flywheel when flywheel speed drops to or below the minimum speed of its range.

4. A method according to claim 3 wherein the step of diminishing power comprises decoupling the prime mover from the flywheel, and the step of increasing power comprises recoupling the prime mover to the flywheel.

5. In a method of controlling the operation of a motor vehicle having a flywheel type power plant including an energy-storing flywheel, an engine operatively coupled to the flywheel for delivering power to the flywheel, and a continuously variable ratio transmission operatively coupled to the flywheel for delivering power to an output shaft to propel the vehicle, the improvement comprising the steps of:

variably selecting a desired maximum vehicle speed liimit;

predetermining a desired flywheel operating speed range defined by a minimum flywheel speed and a maximum flywheel speed, each of said minimum and maximum flywheel speeds being defined as a function of the variably selected desired maximum output shaft speed limit;

measuring the actual speed of the flywheel; and controlling the delivery of power from the engine to the flywheel as a function of measured flywheel speed to keep the speed of the flywheel within said predetermined range.

6. A method according to claim 5 wherein said desired flywheel operating speed range is substantially the minimum speed range required to maintain vehicle speed at said speed limit throughout the transmission ratio range.

7. A method according to claim 6 wherein the step of controlling power delivery comprises diminishing the power delivered to the flywheel when flywheel speed equals or exceeds the maximum speed of its range, and increasing the power delivered to the flywheel when flywheel speed drops to or below the minimum speed of its range.

8. A method according to claim 7 wherein the step of diminishing power comprises decoupling the engine from the flywheel, and the step of increasing power comprises recoupling the engine to the flywheel.

9. A method according to claim 5 further comprising the steps of decoupling the flywheel from the engine and transmission and directly coupling the engine to the transmission for operation at vehicle speeds above approximately the point where fuel economy under flywheel operation has fallen to approximately the fuel economy under direct engine-transmission operation without the flywheel.

10. A method according to claim 9 wherein the changeover point from flywheel to engine-transmission operation is approximately 45 miles per hour.

11. In a flywheel type power delivery system having an energy-storing flywheel, a prime mover operatively coupled to the flywheel for delivering power to the flywheel, and a continuously variable ratio transmission operatively coupled to the flywheel for delivering power to an output shaft, the improvement comprising:

selector means for selecting a desired maximum output shaft speed limit;

speed range function means defining a desired flywheel operating speed range defined by a minimum flywheel speed and a maximum flywheel speed, each of said minimum and maximum flywheel speeds being defined as a function of the selected maximum output shaft speed limit;

speed measuring means for measuring the acutal speed of the flywheel; and power control means for controlling the delivery of power from the prime mover to the flywheel as a function of measured flywheel speed to keep the speed of the flywheel within said predetermined range.

12. A power delivery system according to claim 11 wherein said desired flywheel operating speed range is substantially the minimum speed range required to maintain output shaft speed at said speed limit throughout the transmission ratio range.

13. A power delivery system according to claim 12 wherein said power control means diminishes the power delivered to the flywheel when flywheel speed equals or exceeds the maximum speed of its range, and increases the power delivered to the flywheel when flywheel speed drops to or below the minimum speed of its range.

14. A power delivery system according to claim 13 including coupling means between the prime mover and the flywheel, wherein said power control means disengages the coupling means to diminish the power delivery to the flywheel, and reengages the coupling means to increase the power delivered to the flywheel.

15. In a motor vehicle having a flywheel type power plant including an energy-storing flywheel, an engine operatively coupled to the flywheel for delivering power to the flywheel, and a continuously variable ratio transmission operatively coupled to the flywheel for delivering power to an output shaft to propel the vehicle, the improvement comprising:

selector means for selecting a desired maximum vehicle speed limit;

speed range function means defining a desired flywheel operating speed range defined by a minimum flywheel speed and a maximum flywheel speed, each of said minimum and maximum flywheel speeds being defined as a function of the selected maximum output shaft speed limit;

speed measuring means for measuring the actual speed of the flywheel; and power control means for controlling the delivery of power from the engine to the flywheel as a function of measured flywheel speed to keep the speed of the flywheel within said predetermined range.

16. A motor vehicle according to claim 14 wherein said desired flywheel operating speed range is substantially the minimum speed range required to maintain vehicle speed at said speed limit throughout the transmission ratio range.

17. A motor vehicle according to claim 16 wherein said power control means diminishes the power delivered to the flywheel when flywheel speed equals or exceeds the maximum speed of its range, and increases the power delivered to the flywheel when flywheel speed drops to or below the minimum speed of its range.

18. A motor vehicle according to claim 17 including engine coupling means between the engine and the flywheel, wherein said power control means disengages the engine coupling means to diminish the power to the flywheel, and reengages the engine coupling means to increase the power delivered to the flywheel.

19. A motor vehicle according to claim 15 further comprising vehicle speed responsive coupling means for decoupling the flywheel from the engine and transmission and directly coupling the engine to the transmission for operation at vehicle speeds above approximately the point where fuel economy under flywheel operation has fallen to approximately the fuel economy under direct engine-transmission operation without the flywheel.

20. A motor vehicle according to claim 19 wherein the changeover point from flywheel to engine-transmission operation is approximately 45 miles per hour.

* * * * *